(12) United States Patent
Komatsu (10) Patent No.: US 8,474,309 B2
(45) Date of Patent: Jul. 2, 2013

(54) NOISE EXISTENCE DIAGNOSIS DEVICE FOR FUEL INJECTION SYSTEM

(75) Inventor: Kou Komatsu, Chiryu (JP)

(73) Assignee: Denso Corporation, Kariya (JP)

(*) Notice: Subject to any disclaimer, the term of this patent is extended or adjusted under 35 U.S.C. 154(b) by 98 days.

(21) Appl. No.: 13/300,858

(22) Filed: Nov. 21, 2011

(65) Prior Publication Data

US 2012/0144907 A1 Jun. 14, 2012

(30) Foreign Application Priority Data

Dec. 9, 2010 (JP) ................................. 2010-275051

(51) Int. Cl.
*G01M 15/04* (2006.01)
(52) U.S. Cl.
USPC ...................................................... 73/114.51
(58) Field of Classification Search
USPC ...................................................... 73/114.51
See application file for complete search history.

(56) References Cited

U.S. PATENT DOCUMENTS

| 7,933,712 | B2 * | 4/2011 | Ishizuka et al. ............... 701/114 |
| 8,406,982 | B2 * | 3/2013 | Yamada et al. ............... 701/103 |
| 2008/0228374 | A1 | 9/2008 | Ishizuka et al. |
| 2009/0056678 | A1 | 3/2009 | Nakata et al. |
| 2009/0063012 | A1 | 3/2009 | Nakata et al. |
| 2010/0250095 | A1 | 9/2010 | Yamada et al. |

FOREIGN PATENT DOCUMENTS

| JP | 9-144583 | 6/1997 |
| JP | P2005-337211 A | 12/2005 |
| JP | P2006-316676 A | 11/2006 |

OTHER PUBLICATIONS

Japanese Official Action dated Nov. 13, 2012 issued in corresponding Japanese Application No. 2010-275051, with English translation.

* cited by examiner

*Primary Examiner* — Freddie Kirkland, III
(74) *Attorney, Agent, or Firm* — Nixon & Vanderhye PC (57) ABSTRACT

A waveform detector detects a variation in fuel pressure generated by an injection based on a detection value of a fuel pressure sensor as a fuel pressure waveform. A differential calculator calculates a differential waveform representing a variation in differential value of the fuel pressure waveform. A noise determiner determines that noise overlaps with the fuel pressure waveform when the differential waveform has a value higher than a predetermined upper threshold or when the differential waveform has a value lower than a predetermined lower threshold.

6 Claims, 7 Drawing Sheets

INJECTION-TIME FUEL PRESSURE WAVEFORM Wa

FIG. 5B

NON-INJECTION-TIME FUEL PRESSURE WAVEFORM Wu

FIG. 5C

INJECTION WAVEFORM Wb (Wb = Wa − Wu)

FUEL PRESSURE WAVEFORM

DIFFERENTIAL VALUE

NOISE EXISTENCE DIAGNOSIS DEVICE FOR FUEL INJECTION SYSTEM

CROSS REFERENCE TO RELATED APPLICATION

This application is based on Japanese Patent Application No. 2010-275051 filed on Dec. 9, 2010, the disclosure of which is incorporated herein by reference in its entirety.

BACKGROUND OF THE INVENTION

1. Field of the Invention

The present invention relates to a noise existence diagnosis device for a fuel injection system.

2. Description of Related Art

JP-A-2008-144749 (US 2008/0228374), JP-A-2009-74535 (US 2009/0056678), or JP-A-2010-223185 (US 2010/0250095) describes a fuel pressure sensor which detects a pressure of fuel downstream of a common rail (pressure accumulating container). A change of the fuel pressure generated with fuel injection is detected as a fuel pressure waveform. A change in injection rate of fuel is analyzed based on the detected waveform as an injection state.

For example, a point of inflexion in a start of lowering in the fuel pressure which appears in the waveform is detected, and injection start time can be calculated based on the time when the point of inflexion appears. Moreover, a lowering speed (inclination) of the fuel pressure which appears in the waveform is detected, and a raising speed in the injection rate (inclination) can be calculated based on the lowering speed.

If an actual injection state is known by the analysis, feedback control can be performed for operation of a fuel injection valve based on the injection state, so that the fuel injection state can be controlled with high accuracy.

However, electric noise may overlap with the fuel pressure waveform detected with the sensor because many electric actuators, such as an electric throttle valve and an EGR valve, exist near the sensor. When a signal wire of the sensor is located near a power supply line of the electric actuator, the noise overlap is generated with high possibility. When noise overlaps on the fuel pressure waveform in this way, analysis accuracy of the injection state gets worse and it becomes impossible to control the fuel injection state with the high accuracy.

High frequency noise may be removed from the fuel pressure waveform using a low pass filter circuit. However, complete removal of the noise is difficult, although such filter circuit can reduce an amplitude of the high frequency noise, based on characteristics of the circuit.

The noise overlap cannot be known only using the low pass filter circuit.

SUMMARY OF THE INVENTION

The present invention is made in view of the above matters, and it is an object of the present invention to provide a noise existence diagnosis device for a fuel injection system. The device enables to maintain accuracy of fuel injection control high by determining whether noise overlaps with fuel pressure waveform.

According to an example of the present invention, a noise existence diagnosis device for a fuel injection system includes a fuel injection valve, a fuel pressure sensor, a waveform detector, a differential calculator, and a noise determiner. The fuel injection valve injects fuel accumulated in an accumulator. The fuel pressure sensor detects a fuel pressure in a fuel supply passage from the accumulator to an injection port of the fuel injection valve. The waveform detector detects a variation in fuel pressure based on detection value of the fuel pressure sensor when the variation is generated by a fuel injection. The detected variation of the fuel pressure is output as a fuel pressure waveform. The differential calculator calculates a differential waveform representing a variation in differential value of the fuel pressure waveform. The noise determiner determines that noise overlaps with the fuel pressure waveform when the differential waveform has a value higher than a predetermined upper threshold or when the differential waveform has a value lower than a predetermined lower threshold.

Accordingly, the noise overlap can be detected by the noise existence diagnosis device.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

An embodiment of a noise existence diagnosis device for a fuel injection system according to the present invention will be described. The fuel injection system is applied to an internal combustion engine (diesel engine) having four cylinders #1-#4, in which compression self-ignition combustion is generated by injecting high pressure fuel.

Figure 1:
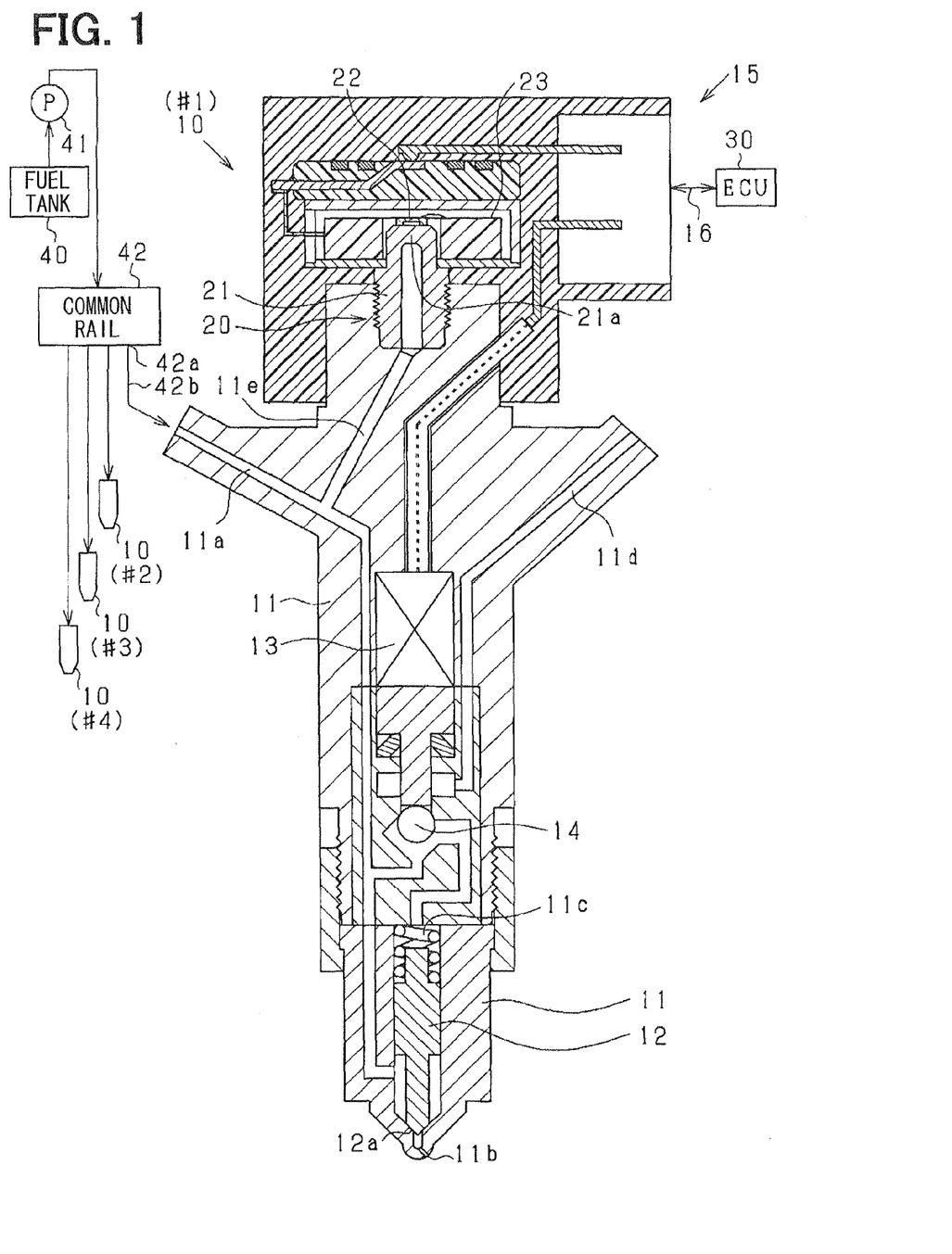
FIG. 1 is a construction diagram illustrating an outline of a fuel injection system having a noise existence diagnosis device according to an embodiment of the present invention.

As shown in FIG. 1, a fuel injection valve 10 is provided to each cylinder of the engine. A fuel pressure sensor 20 is provided to each fuel injection valve 10. An electronic control unit (ECU) 30 is mounted on a vehicle having the engine.

The fuel injection system will be explained. A fuel in a fuel tank 40 is pumped up by a fuel pump 41 and is accumulated in a common rail (accumulator) 42 to be supplied to each fuel injection valve 10(#1-#4). The fuel injection valves 10 (#1-#4) perform fuel injections sequentially in a predetermined order. The fuel pump 41 is a plunger pump which intermittently discharges high-pressure fuel.

The fuel injection valve 10 has a body 11, a needle valve 12, an actuator 13 and the like. The body 11 defines a high-pressure passage 11a and an injection port 11b. The needle valve 12 is accommodated in the body 11 to open/close the injection port 11b.

The body 11 defines a backpressure chamber 11c with which the high pressure passage 11a and a low pressure passage lid communicate. A control valve 14 switches between the high pressure passage 11a and the low pressure passage 11d, so that the high pressure passage 11a communicates with the backpressure chamber 11c or the low pressure passage 11d communicates with the backpressure chamber 11c.

When the actuator 13 is energized, the control valve 14 moves downward in FIG. 1, and the backpressure chamber 11c communicates with the low pressure passage 11d, so that the fuel pressure in the backpressure chamber 11c is decreased. Consequently, the back pressure applied to the needle valve 12 is decreased so that the needle valve 12 is lifted up (opened).

When the actuator 13 is deenergized, the control valve 14 moves upward in FIG. 1, and the backpressure chamber 11c communicates with the high pressure passage 11a, so that the fuel pressure in the backpressure chamber 11c is increased. Consequently, the back pressure applied to the needle valve 12 is increased so that the valve body 12 is lifted down (closed).

The ECU 30 controls the actuator 13 that drives the needle valve 12. When the needle valve 12 opens the injection port 11b, high-pressure fuel in the high pressure passage 11a is injected to a combustion chamber (not shown) of the engine through the injection port 11b.

The fuel pressure sensor 20 includes a stem 21 (load cell), a pressure sensor element 22 and a molded IC 23. The stem 21 is provided to the body 11. The stem 21 has a diaphragm 21a which elastically deforms in response to high fuel pressure in the high-pressure passage 11a. The pressure sensor element 22 is disposed on the diaphragm 21a to output a pressure detection signal depending on an elastic deformation of the diaphragm 21a.

The molded IC 23 includes an amplifier circuit which amplifies a pressure detection signal transmitted from the pressure sensor element 22 and includes a transmitting circuit which transmits the pressure detection signal. A connector 15 is provided on the body 11. The molded IC 23, the actuator 13 and the ECU 30 are electrically connected to each other through a harness 16 (signal wire) connected to the connector 15. The amplified pressure detection signal is transmitted to the ECU 30. Such a signal communication processing is executed with respect to each cylinder.

The ECU 30 computes a target fuel-injection condition (number of stages of fuel injection, fuel-injection-start timing, fuel-injection-end timing, fuel injection quantity and the like) based on the engine load and the engine speed NE, which are derived from an accelerator position. For example, the ECU 30 stores an optimum fuel-injection condition with respect to the engine load and the engine speed as a fuel-injection condition map. Then, based on the current engine load and engine speed, the target fuel-injection condition is computed in view of the fuel-injection condition map.

Figure 2A:
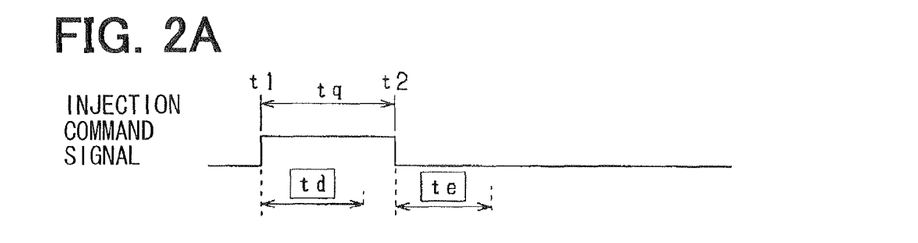
FIG. 2A is a chart illustrating an injection command signal to a fuel injection valve.

Further, the ECU 30 generates fuel-injection-command signals "t1", "t2", "Tq" (see FIG. 2A) corresponding to the computed target fuel-injection condition based on injection rate parameter "td", "te", "Rα", "Rβ" and "Rmax" to be described below. The fuel injection valve 10 is controlled by inputting the signals.

Due to aging degradation of the injection valve 10 such as wear or clogging of the injection port 11b, an actual injection state changes with respect to the injection command signal.

Figure 2B:
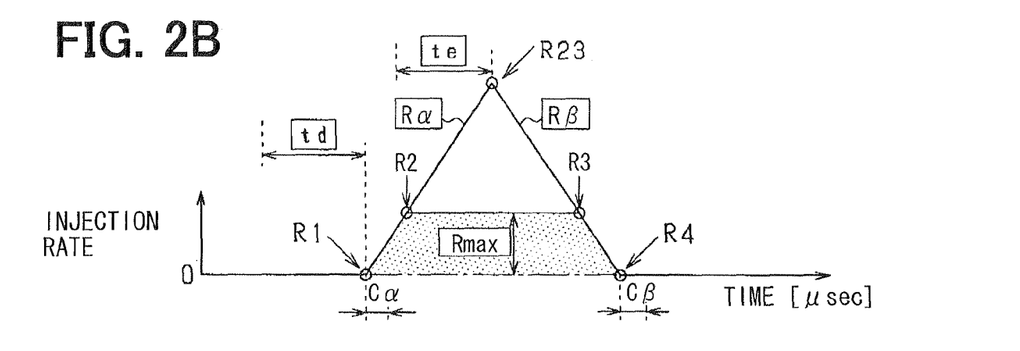
FIG. 2B is a chart illustrating an injection rate waveform indicative of a variation in fuel injection rate.
Figure 2C:
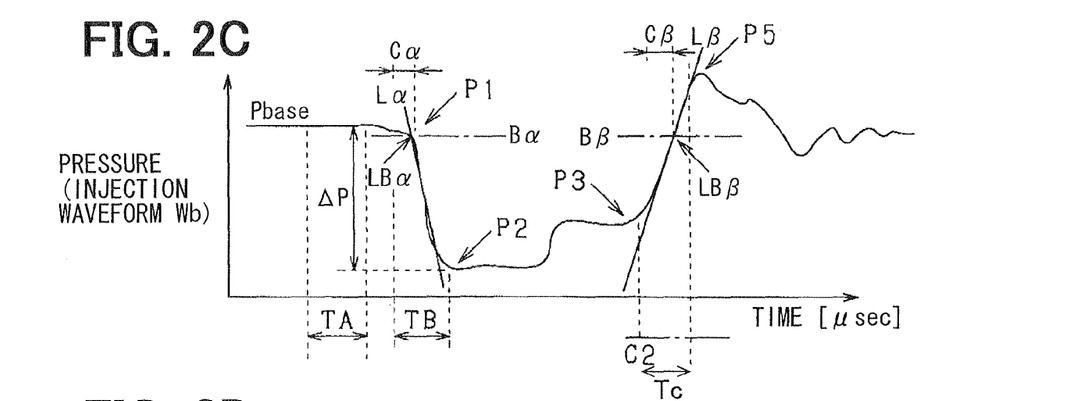
FIG. 2C is a chart illustrating a fuel pressure waveform indicative of a variation in fuel pressure.

As shown in FIG. 2C, a fuel pressure waveform is detected based on detection values of the sensor 20, and corresponds to a variation in fuel pressure when the variation is generated by a fuel injection. Further, as shown in FIG. 2B, injection rate waveform is calculated based on the detected fuel pressure waveform, and represents a variation in injection rate of fuel. Fuel injection state is detected by the calculation of the injection rate waveform. The injection rate parameter "Rα", "Rβ" and "Rmax" that specifies the detected injection rate waveform (injection state) is learned. Further, the injection rate parameter "td", "te" that specifies a relationship between the injection command signal (pulse-on timing "t1", pulse-off timing "t2", and an energization time period "Tq") and the injection state is learned. Specifically, as shown in FIG. 2B, injection-start-delay period "td", injection-end-delay period "te", injection-rate increase gradient "Rα", injection-rate decrease gradient "Rβ", and maximum injection rate "Rmax" are learned.

Figure 3:
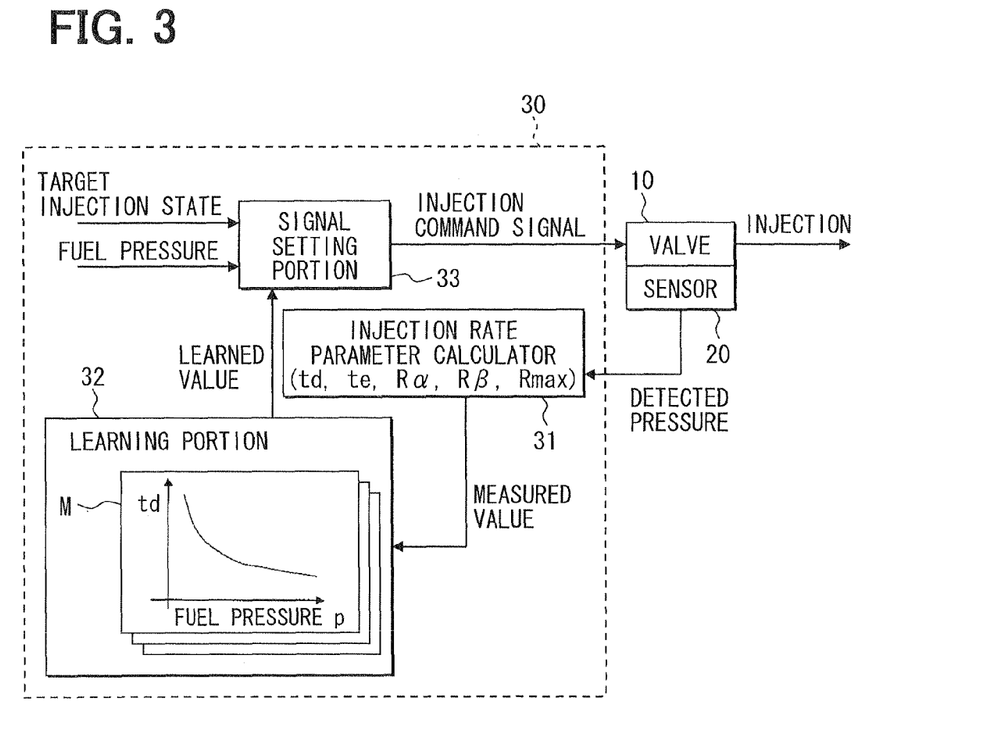
FIG. 3 is a functional block diagram of an ECU which establishes a learning of injection rate parameter and a setting of injection command signal.

As shown in FIG. 3, the ECU 30 includes an injection rate parameter calculator 31 corresponding to an injection state analyzer that calculates the injection rate parameter "td", "te", "Rα", "Rβ" and "Rmax" based on the fuel pressure waveform detected by the sensor 20.

A learning portion 32 learns and updates the calculated parameter in a memory. The parameter changes in accordance with a change in supply fuel pressure (pressure in the common rail 42). Therefore, the learning of the parameter may be related with the supply fuel pressure or a base pressure Pbase to be described below. Further, the other parameters except the maximum injection rate Rmax may be learned with relation to injection quantity. In FIG. 3, the injection rate parameter values corresponding to fuel pressure are memorized in an injection rate parameter map M.

A signal setting portion 33 obtains the learned parameter corresponding to the present fuel pressure from the map M, and sets the signals t1, t2, Tq corresponding to the target injection state based on the parameter. A fuel pressure waveform obtained when the valve 10 is activated by the signals is detected by the sensor 20. The calculator 31 calculates the parameter "td", "te", "Rα", "Rβ" and "Rmax" based on the detected fuel pressure waveform.

That is, actual injection state (i.e., injection rate parameter "td", "te", "Rα", "Rβ" and "Rmax") corresponding to the injection command signal is detected and learned. New injection command signal is set correspondingly to the target injection state based on the learned value. Thus, feedback control is performed to the command signal based on the actual injection state, so that the fuel injection state can be controlled with high accuracy even if the aging degradation is generated.

A processing of calculating the injection rate parameter "td", "te", "Rα", "Rβ" and "Rmax" of FIG. 2B from the detected waveform of FIG. 2C will be described with reference to FIG. 4. The processing is performed by a microcomputer of the ECU 30 every time when a single injection is conducted. The fuel pressure waveform represents an assembly of detection values of the sensor 20 which are obtained with predetermined sampling cycle.

Figure 4:
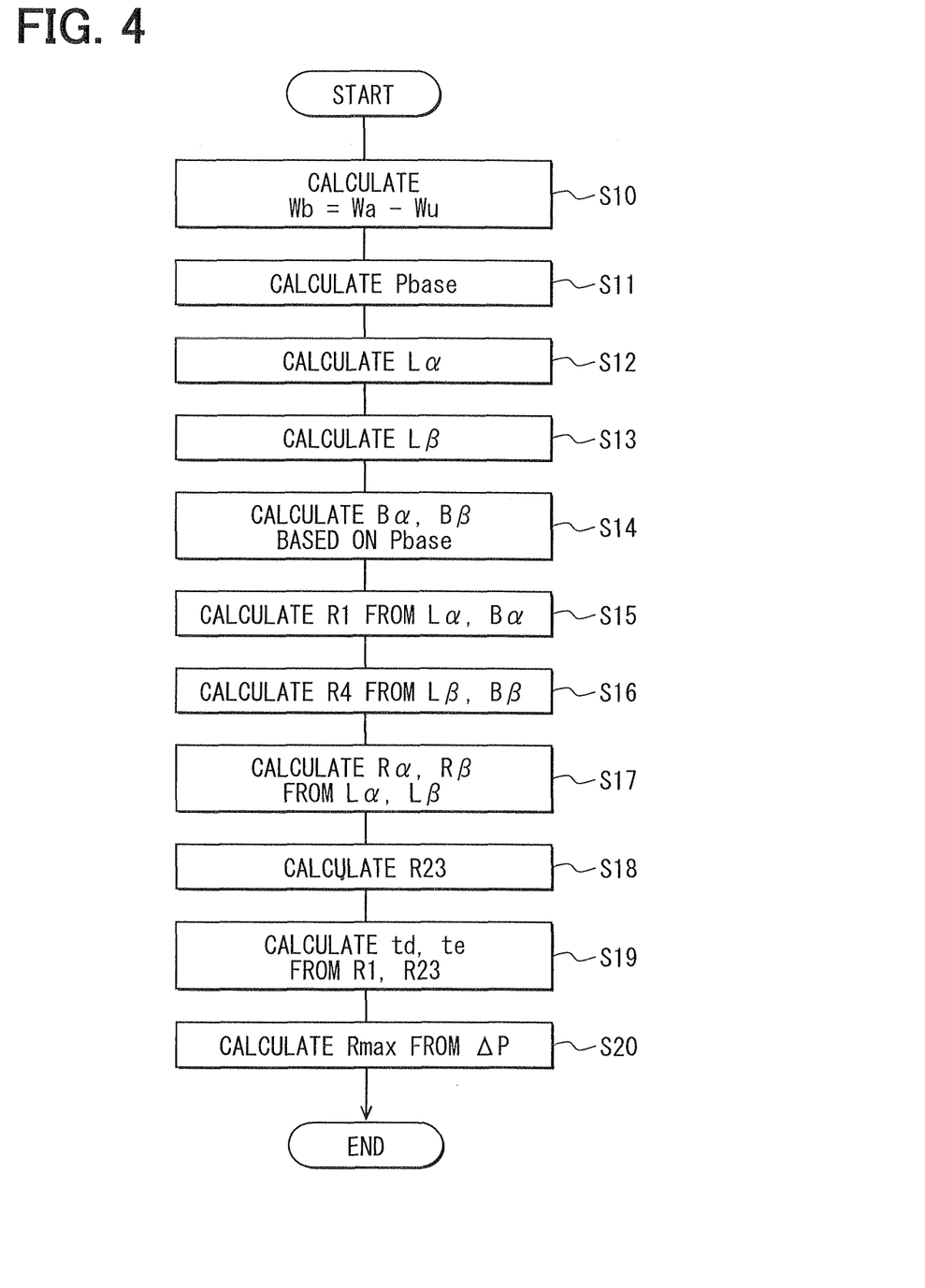
FIG. 4 is a flowchart illustrating a computing process of injection rate parameter.

In S10 of FIG. 4, an injection waveform Wb (corrected fuel pressure waveform) that is to be used for calculating the injection rate parameter is calculated. A cylinder into which fuel is being injected from the valve 10 is defined as an injection-time cylinder. A cylinder into which fuel is not being injected from the valve 10 when fuel injection is performed in the injection-time cylinder is defined as a non-injection-time cylinder. The sensor 20 corresponding to the injection-time cylinder is defined as an injection-time fuel pressure sensor. The sensor 20 corresponding to the non-injection-time cylinder is defined as a non-injection-time fuel pressure sensor.

Figure 5A:
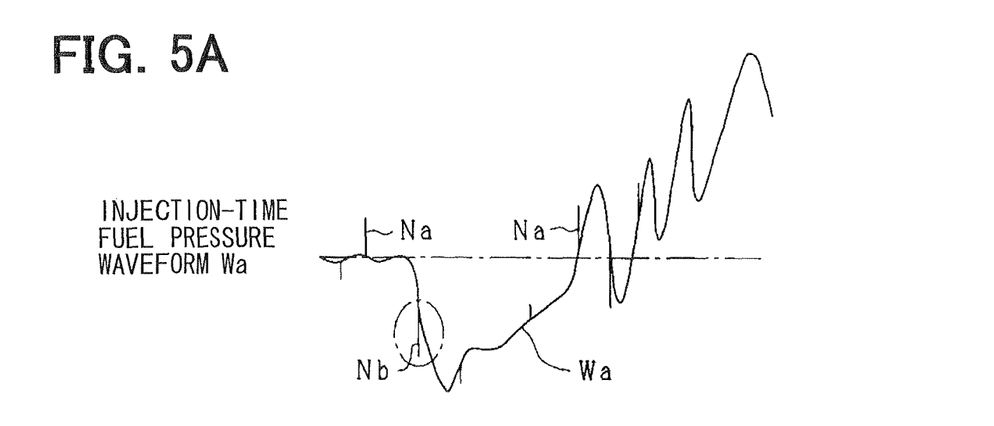
FIG. 5A is a chart illustrating an injection-time fuel pressure waveform.

An injection-time fuel pressure waveform Wa of FIG. 5A does not represent a waveform that is influenced by only the injection. Rather, the injection-time waveform Wa includes a waveform component caused by influence other than the injection exemplified below. For example, in the case where the fuel pump 41 for pumping fuel in the fuel tank 40 to the common rail 42 intermittently pumps fuel like a plunger pump, if the pumping is performed during the fuel injection, the pressure of the waveform Wa increases during the fuel injection. That is, the injection-time waveform Wa of FIG. 5A includes an injection waveform component Wb of FIG. 5C indicating fuel pressure change due to the injection and a non-injection-time waveform component Wu of FIG. 5B indicating the fuel pressure increase due to the pumping.

Even if the pumping is not performed during the fuel injection, immediately after fuel injection is performed, the fuel pressure in the entire injection system decreases by the injected amounted. Therefore, the injection-time waveform Wa becomes a waveform with pressure decreased as a whole. That is, the injection-time waveform Wa includes the waveform component Wb indicating the fuel pressure change due to the injection and a waveform component Wu' (refer to broken line in FIG. 5B) indicating the fuel pressure decrease in the entire injection system.

In S10 of FIG. 4, the waveform Wb is calculated by subtracting the non-injection-time waveform Wu(Wu') from the injection-time waveform Wa, because the non-injection-time waveform Wu(Wu') represents a variation in the fuel pressure in the common rail (entire injection system). The fuel pressure waveform shown in FIG. 2C represents the injection waveform Wb.

Figure 2D:
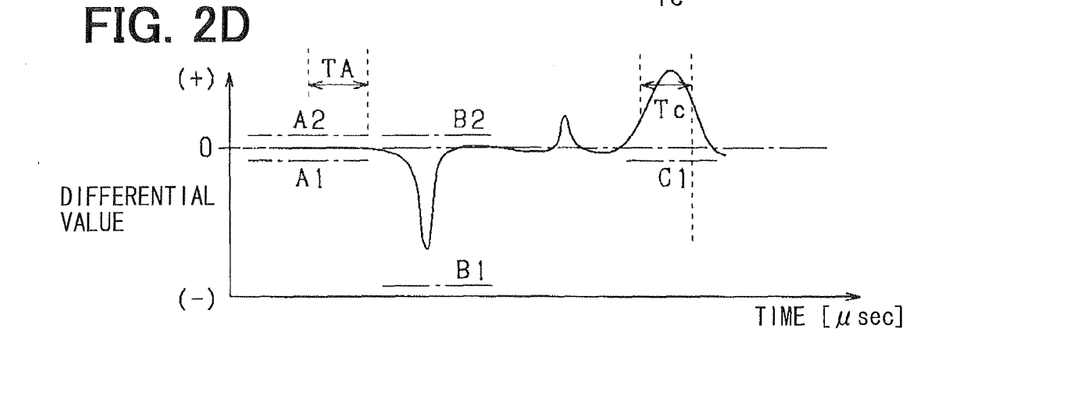
FIG. 2D is a chart illustrating a differential value waveform indicative of a variation in differential value.

In S11, a base pressure Pbase is calculated based on average of the fuel pressure in a base waveform of the injection waveform Wb. The base waveform is defined to correspond to a period started when the injection is started and ended when the fuel pressure starts decreasing. For example, the base waveform may be set to correspond to a period TA of FIG. 2C that is elapsed from the injection start command timing t1. Alternatively, an inflection point P1 of the decreasing waveform of FIG. 2C is calculated based on the differential value of FIG. 2D, and the base waveform may be set to correspond to a period defined from the injection start command timing t1 to a timing that is before the inflection point P1 by a predetermined period.

In S12, an approximation line Lα of the decreasing waveform is calculated based on a decreasing waveform of the injection waveform Wb corresponding to a period while the fuel pressure is decreasing in accordance with increase in the injection rate. For example, the decreasing waveform may be set to correspond to a period TB of FIG. 2C. The period TB is started when a predetermined period is elapsed from the timing t1. Alternatively, an inflection point P1 and an inflection point P2 of the decreasing waveform are calculated based on the differential value of FIG. 2D, and the decreasing waveform may be set to correspond to a period between the inflection point P1 and the inflection point P2. Then, the approximation line Lα may be calculated using least square approximation method from plural detection (sample) values of the fuel pressure constructing the decreasing waveform. Alternatively, a tangent line may be used as the approximation line Lα at a time when the differential value of the decreasing waveform becomes the smallest.

In S13, an approximation line Lβ of the increasing waveform is calculated based on an increasing waveform of the injection waveform Wb corresponding to a period while the fuel pressure is increasing in accordance with decrease in the injection rate. For example, the increasing waveform may be set to correspond to a period TC started when a predetermined period is elapsed from the timing t2. Alternatively, an inflection point P3 and an inflection point P5 of the increasing waveform are calculated based on the differential value of FIG. 2D, and the increasing waveform may be set to correspond to a period between the inflection point P3 and the inflection point P5. Then, the approximation line Lβ may be calculated using least square approximation method from plural detection (sample) values of the fuel pressure constructing the increasing waveform. Alternatively, a tangent line may be used as the approximation line Lβ at a time when the differential value of the increasing waveform becomes the largest.

In S14, a base value Bα, Bβ of FIG. 2C is calculated based on the base pressure Pbase. For example, the base value Bα, Bβ is set to be lower than the base pressure Pbase by a predetermined value. The base value Bα, and the base value Bβ are not always the same. The predetermined value may be variable in accordance with the base pressure Pbase or temperature of fuel, for example.

In S15, as shown in FIG. 2C, an intersection point between the approximation line Lα and the base value Bα is calculated as an intersection timing LBα. Because the intersection timing LBα and an injection start timing R1 have close correspondence, the injection start timing R1 is calculated based on the intersection timing LBα. For example, the injection start timing R1 may be set before the intersection timing LBα by a predetermined delay period Cα.

In S16, as shown in FIG. 2C, an intersection point between the approximation line Lβ and the base value Bβ is calculated as an intersection timing LBβ. Because the intersection timing LBβ and an injection end timing R4 have close correspondence, the injection end timing R4 is calculated based on the intersection timing LBβ. For example, the injection end timing R4 may be set before the intersection timing LBβ by a predetermined delay period Cβ. The predetermined delay period Cα, Cβ may be variable in accordance with the base pressure Pbase or temperature of fuel, for example.

In S17, because an inclination of the approximation line Lα and an inclination of the increase in the injection rate have close correspondence, an inclination of a line Rα indicative of an injection increase of the injection rate waveform of FIG. 2B is calculated based on the inclination of the approximation line Lα. For example, the inclination of the line Rα may be calculated by multiplying the inclination of the approximation line Lα by a predetermined coefficient. The line Rα indicative of an increasing part of the injection rate waveform with respect to the injection command signal can be specified based on the injection start timing R1 calculated at S15 and the inclination of the line Rα calculated at S17.

Further, in S17, because an inclination of the approximation line Lβ and an inclination of the decrease in the injection rate have close correspondence, an inclination of a line Rβ indicative of an injection decrease of the injection rate waveform is calculated based on the inclination of the approximation line Lβ. For example, the inclination of the line Rβ may be calculated by multiplying the inclination of the approximation line Lβ by a predetermined coefficient. The line Rβ indicative of a decreasing part of the injection rate waveform with respect to the injection command signal can be specified based on the injection end timing R4 calculated at S16 and the inclination of the line Rβ calculated at S17. The predetermined coefficient may be variable in accordance with the base pressure Pbase or temperature of fuel, for example.

In S18, a valve-close-operation start timing R23 is calculated based on the line Rα, Rβ of the injection rate waveform calculated at S17. The valve 12 starts to close at the valve-close-operation start timing R23 when the injection end is ordered. Specifically, an intersection point between the line Rα and the line Rβ is calculated, and the calculated intersection point corresponds to the valve-close-operation start timing R23.

In S19, an injection-start-delay time "td" of the injection start timing R1 calculated at S15 is calculated relative to the injection start command timing t1. Further, an injection-end-delay time "te" of the valve-close-operation start timing R23 calculated at S18 is calculated relative to the injection end command timing t2.

In S20, a maximum drop amount ΔP of FIG. 2C is calculated from the injection waveform Wb, and a maximum injection rate Rmax is calculated based on the calculated maximum drop amount ΔP, because the maximum drop amount ΔP and the maximum injection rate Rmax have close correspondence. For example, the maximum injection rate Rmax is calculated by multiplying the maximum drop amount ΔP by a predetermined coefficient. The predetermined coefficient may be variable in accordance with the base pressure Pbase or temperature of fuel, for example.

Thus, due to the processing of FIG. 4, the injection rate parameter "td", "te", "Rα", "Rβ" and "Rmax" can be calculated from the injection waveform Wb. Further, the injection rate waveform of FIG. 2B corresponding to the injection command signal of FIG. 2A can be calculated based on the injection rate parameter "td", "te", "Rα", "Rβ" and "Rmax". A hatched area of FIG. 2B of the calculated injection rate waveform corresponds to the injection amount, so that the injection amount can be calculated based on the injection rate parameter. When the injection command period Tq is sufficiently long, and when the valve-opened state is maintained after reaching the maximum injection rate, the injection rate waveform has a trapezoidal shape, as shown in FIG. 2B. In contrast, when the valve starts to be closed before reaching the maximum injection rate, the injection is small and the injection rate waveform has a triangle shape.

Because many electric actuators such as electric throttle valve and EGR valve are arranged in an engine compartment of the vehicle, noise may overlap with the pressure detection signal detected by the sensor 20. The noise overlap is generated with high possibility when the harness 16 of the sensor 20 is located adjacent to a power supply line of the actuator.

Figure 5B:
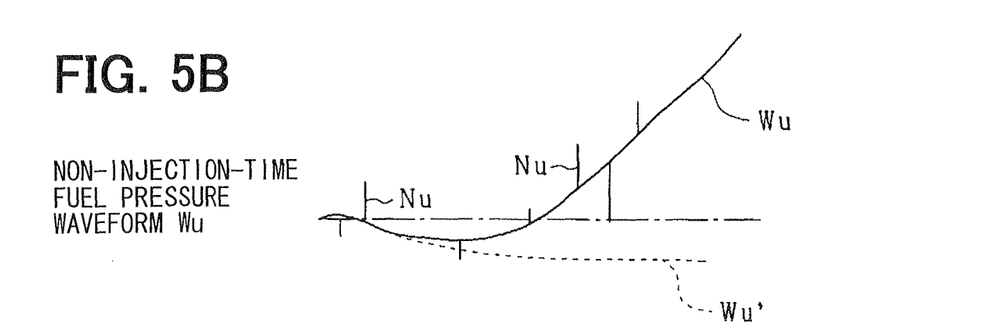
FIG. 5B is a chart illustrating a non-injection-time fuel pressure waveform.
Figure 5C:
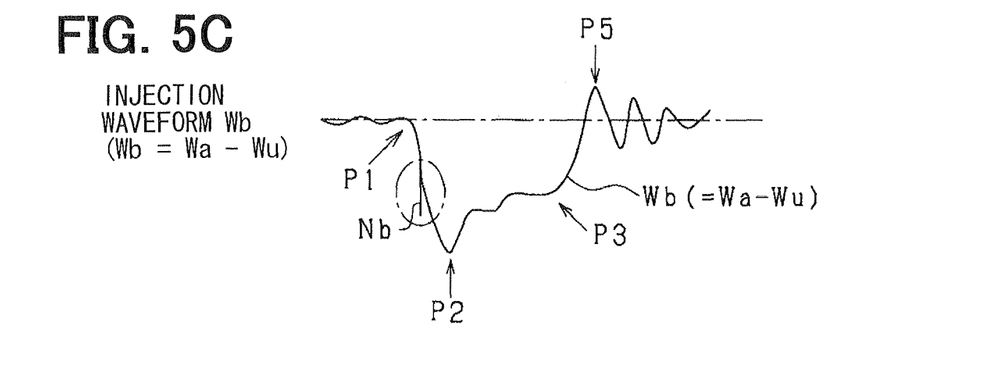
FIG. 5C is a chart illustrating an injection waveform.

Codes Na, Nb, Nu of FIGS. 5A, 5B and 5C represent noises. If the injection rate parameter is calculated based on the fuel pressure waveform with which the noise Na, Nb, Nu overlaps, large calculation error may be generated. According to the embodiment, noise existence is determined by a processing of FIG. 6. If it is determined that there is noise, the learning of the injection rate parameter is prohibited. The processing of FIG. 6 is performed by the microcomputer of the ECU 30 every time when the injection waveform Wb is calculated at S10 of FIG. 4.

Figure 6:
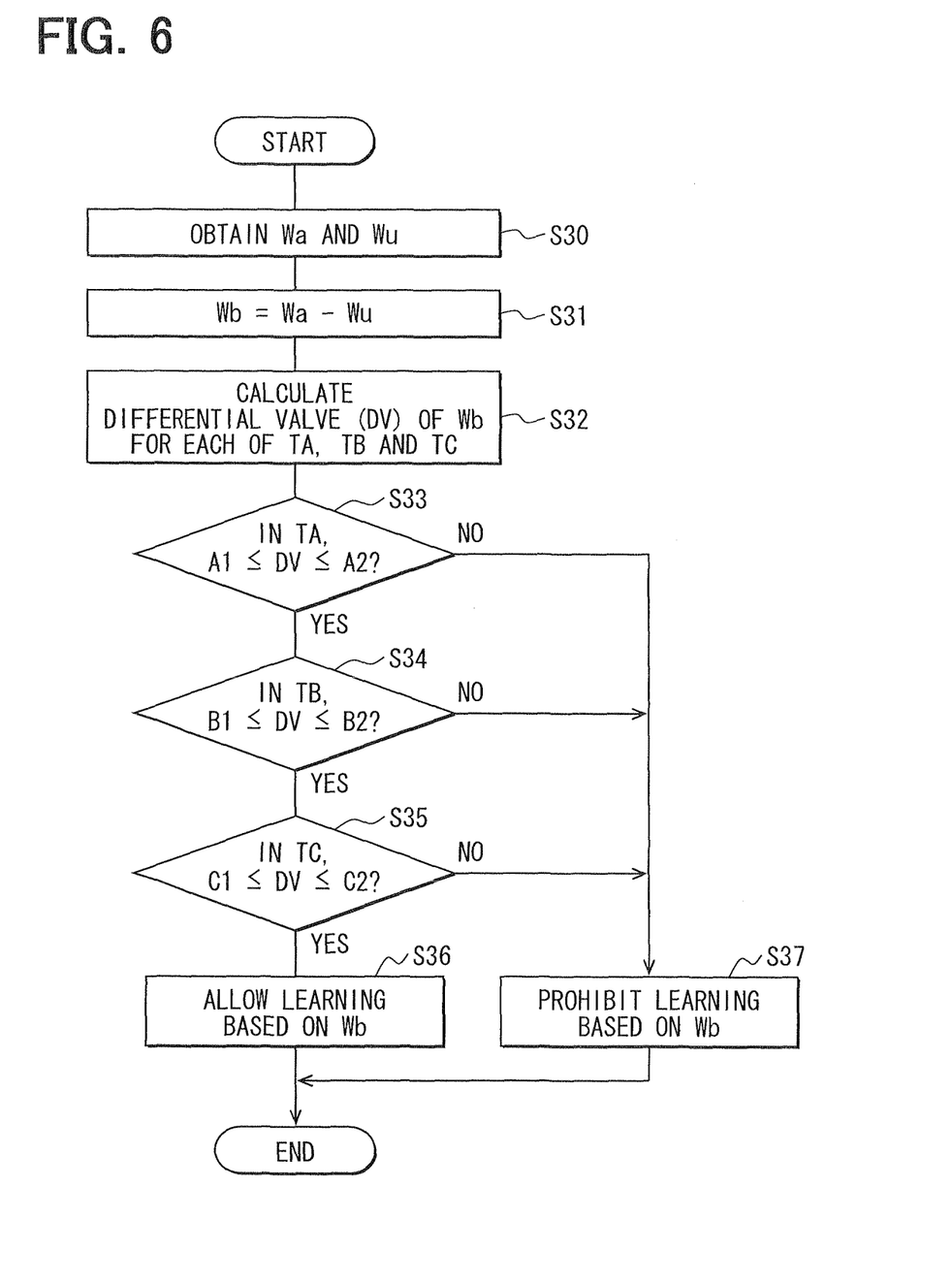
FIG. 6 is a flowchart illustrating a determining processing of noise existence.

As shown in FIG. 6, in S30 corresponding to a fuel pressure waveform detector, the injection-time fuel pressure waveform Wa of FIG. 5A and the non-injection-time fuel pressure waveform Wu of FIG. 5B are obtained. In S31, the injection waveform Wb of FIG. 5A or FIG. 2C is calculated by subtracting the non-injection-time fuel pressure waveform Wu from the injection-time fuel pressure waveform Wa.

In S32 corresponding to a differential calculator, a differential value of the calculated injection waveform Wb is calculated. The calculation of the differential value is performed not all area of the injection waveform Wb, and is performed only for the base waveform used for calculating the base pressure Pbase, the decreasing waveform used for calculating the approximation line Lα, and the increasing waveform used for calculating the approximation line Lβ. That is, the differential value is calculated for each of the base waveform of the period TA, the decreasing waveform of the period TB and the increasing waveform of the period TC.

In S33 corresponding to a noise determiner, the differential value calculated in the period TA is determined to be within a predetermined range or not. The predetermined range is defined between a lower threshold A1 and an upper threshold A2 of FIG. 2D. The lower threshold A1 has a positive value, and the upper threshold A2 has a negative value. In an example of FIG. 2D, absolute values of the thresholds A1, A2 are set the same, but are not limited to be the same.

When it is determined that there is a differential value that is out of the predetermined range (S33:No), it is determined that there is noise in the base waveform, and the learning of the injection rate parameter calculated based on the corresponding waveform Wb is prohibited at S37. When it is determined that the differential value of the base waveform in the period TA is determined to be within the predetermined range (S33:Yes), S34 is performed.

In S34 corresponding to a noise determiner, the differential value calculated in the period TB is determined to be within a predetermined range or not. The predetermined range is defined between a lower threshold B1 and an upper threshold B2. The lower threshold B1 has a positive value, and the upper threshold B2 has a negative value. An absolute value of the upper threshold B2 is set smaller than an absolute value of the lower threshold B1.

When it is determined that there is a differential value that is out of the predetermined range (S34:No), it is determined that there is noise in the decreasing waveform, and the learning of the injection rate parameter calculated based on the corresponding waveform Wb is prohibited at S37. When it is determined that the differential value of the decreasing waveform in the period TB is determined to be within the predetermined range (S34:Yes), S35 is performed.

In S35 corresponding to a noise determiner, the differential value calculated in the period TC is determined to be within a predetermined range or not. The predetermined range is defined between a lower threshold C1 and an upper threshold C2. The lower threshold C1 has a positive value, and the upper threshold C2 has a negative value. An absolute value of the lower threshold C1 is set smaller than an absolute value of the upper threshold C2.

When it is determined that there is a differential value that is out of the predetermined range (S35:No), it is determined that there is noise in the increasing waveform, and the learning of the injection rate parameter calculated based on the corresponding waveform Wb is prohibited at S37. When it is determined that the differential value of the increasing waveform in the period TC is determined to be within the predetermined range (S35:Yes), S36 is performed.

In S36, the learning of the injection rate parameter calculated based on the corresponding waveform Wb is allowed.

The sensors 20 respectively arranged in the different cylinders may output signals having the same-shape noise. For example, the noise Na of the injection-time waveform Wa of FIG. 5A has a similar shape with the noise Nu of the noninjection-time waveform Wu of FIG. 5B, and the overlap of the noise is generated at the same timing. Therefore, in S31 of FIG. 6, the noise Na is removed from the injection waveform Wb obtained by subtracting the non-injection-time waveform Wu from the injection-time waveform Wa.

In contrast, the noise Nb is not overlap with the non-injection-time waveform Wu, so that the noise Nb appears in the injection waveform Wb without being removed. That is, the noise Nb cannot be removed by the subtraction of the non-injection-time waveform Wu, so that the determining process of S33-S35 of FIG. 6 is performed for such noise Nb.

Figures 7A, 7C:
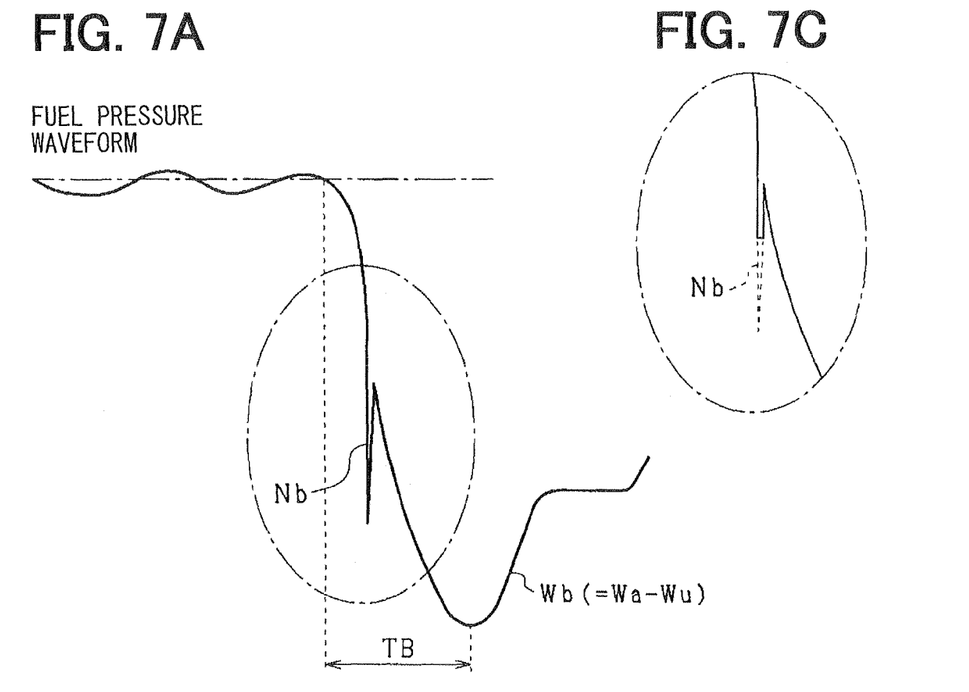
FIG. 7A is a chart illustrating a fuel pressure waveform having noise.
FIG. 7C is a modification example of a chain line circle of FIG. 7A.
Figure 7B:
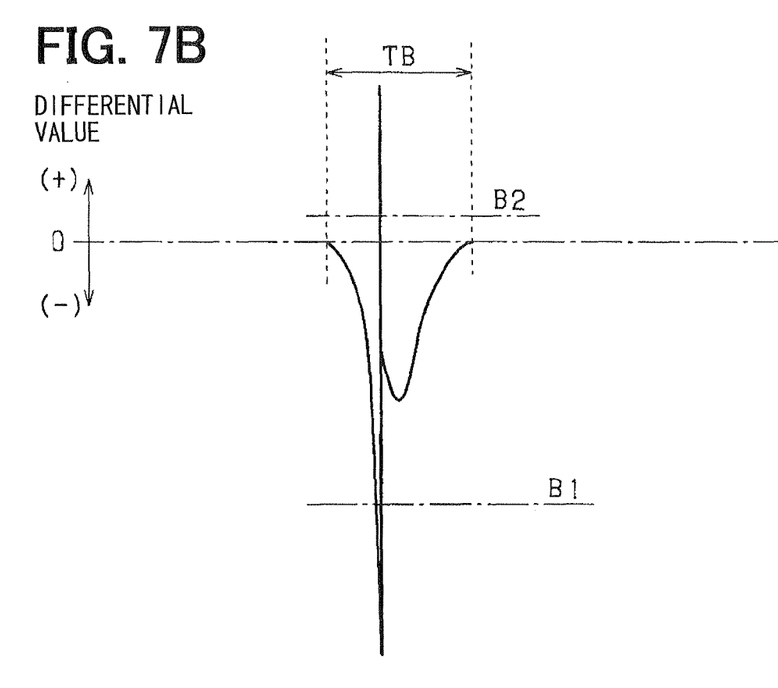
FIG. 7B is a chart illustrating a differential value of the fuel pressure waveform of FIG. 7A.

FIG. 7A is an enlarge view of a single-chained circle of FIG. 5C indicating the injection waveform Wb. FIG. 7B is a waveform of the differential value of the waveform Wb, and corresponds to the differential value in the period TB calculated at S32 of FIG. 6. If the noise Nb overlaps the waveform Wb, the differential value has large variation, so that the differential value exceeds the predetermined area between the lower threshold B1 and the upper threshold B2. Therefore, if the lower threshold B1 and the upper threshold B2 are set slightly larger than a value obtained when the noise does not overlap, the existence of the noise Nb can be determined with high accuracy.

Advantages of the embodiment will be described below.

It is determined that there is a noise overlap, when the differential value of the injection waveform Wb has a value exceeding the upper threshold or the lower threshold. As shown in FIG. 7B, the differential value waveform has a large variation when the overlap of the noise Nb is generated. Therefore, the noise can be detected with high accuracy in the embodiment.

When it is determined that there is noise in the waveform Wb, the learning of the injection rate parameter calculated based on the waveform Wb is prohibited. Therefore, the controlling of the fuel injection state can be restricted from becoming worse.

The non-injection-time waveform Wu and the injection-time waveform Wa are detected at the same timing, and the noise detection is performed relative to the corrected waveform Wb obtained by subtracting the non-injection-time waveform Wu from the injection-time waveform Wa. Therefore, the noise Na, Nu overlapping with both of the waveforms Wa, Wu with the same shape can be removed. The noise detection is performed with respect to the noise Nb that cannot be removed by the correction. Thus, the determination accuracy of the noise existence can be raised.

The differential calculation is performed each of the base waveform, the decreasing waveform and the increasing waveform. Therefore, load of the differential calculation at S32 of FIG. 6 can be reduced. Further, an area for the noise determination can be narrowed, so that load of the noise determination at S33-S35 of FIG. 6 can be reduced.

The upper threshold and the lower threshold are set correspondingly to each of the base waveform, the decreasing waveform and the increasing waveform. The thresholds are set appropriately close to value of the waveform that does not have the noise, so that erroneous determination can be reduced.

Specifically, an absolute value of the upper threshold B2 of the decreasing waveform is set smaller than that of the lower threshold B1, and an absolute value of the lower threshold C1 of the increasing waveform is set smaller than that of the upper threshold C2. Therefore, the upper threshold B2, C2 and the lower threshold B1, C1 are set appropriately close to the value of the waveform that does not have the noise, so that erroneous determination can be reduced.

The fuel pressure variation is small in the base waveform, and the differential value is stably close to zero, so that the thresholds are set adjacent to zero in the base waveform.

The differential value has a minus value in the decreasing waveform during an actual fuel pressure variation, so that a possibility of erroneous determination is small when the upper threshold for the decreasing waveform is set to have a small positive value. In contrast, the possibility of erroneous determination is increased when an absolute value of the lower threshold for the decreasing waveform is set to have a small value. Therefore, the upper threshold B2 corresponding to the decreasing waveform has an absolute value that is set smaller than an absolute value of the lower threshold B1 corresponding to the decreasing waveform.

The differential value has a plus value in the increasing waveform during an actual fuel pressure variation, so that a possibility of erroneous determination is small when the lower threshold for the increasing waveform is set to have a small negative value. In contrast, the possibility of erroneous determination is increased when an absolute value of the upper threshold for the increasing waveform is set to have a small value. Therefore, the lower threshold C1 corresponding to the increasing waveform has an absolute value that is set smaller than an absolute value of the upper threshold C2 corresponding to the increasing waveform.

Other Embodiments

The present invention is not limited to the description of the above embodiment, and may be practiced in the following modified states.

As shown in FIG. 7C illustrating a modification example of a single-chained circle of FIG. 7A, the noise Nb may be eliminated from the waveform Wb when it is determined that there is noise. For example, a part of the waveform Wb whose differential value exceeds the threshold B1, B2 is processed in a manner that an inclination (differential value) of the fuel pressure becomes within the predetermined range such as between the threshold B1 and the threshold B2.

Alternatively, the part of the waveform Wb whose differential value exceeds the threshold B1, B2 may be deleted, and correction is made using the other fuel pressure values. That is, according to the present embodiment, a position at which the noise Nb overlaps with the waveform Wb can be specified, so that the noise Nb can be easily removed.

The upper thresholds A1, B1, C1 may be made the same with each other, and the lower thresholds A2, B2, C2 may be made the same with each other. The absolute value of the upper threshold A1, B1, C1 may be made the same as that of the lower threshold A2, B2, C2.

The differential value may be calculated for entire area of the injection waveform Wb, not separating into the base waveform, the decreasing waveform and the increasing waveform. The noise determination may be performed for entire area of the injection waveform Wb.

The noise determination may be performed by calculating the differential value waveform relative to the injection-time fuel pressure waveform Wa without the subtraction of the non-injection-time fuel pressure waveform Wu.

The fuel pressure sensor 20 is mounted to the fuel injection valve 10 in the above description. The sensor 20 is located to detect a pressure of fuel in the fuel supply passage extending from an outlet 42a of the common rail 42 to the injection port 11b. For example, the fuel pressure sensor may be arranged in a high pressure pipe 42b that connects the common rail 42 to the fuel injection valve 10. That is, the high pressure pipe 42*b* or the high pressure passage 11*a* may correspond to a fuel passage.

Such changes and modifications are to be understood as being within the scope of the present invention as defined by the appended claims.

What is claimed is:

1. A noise existence diagnosis device for a fuel injection system comprising:
   a fuel injection valve that injects fuel accumulated in an accumulator;
   a fuel pressure sensor that detects a fuel pressure in a fuel supply passage from the accumulator to an injection port of the fuel injection valve;
   a waveform detector that detects a variation in the fuel pressure based on a detection value of the fuel pressure sensor as a fuel pressure waveform when the variation is generated by a fuel injection;
   a differential calculator that calculates a differential waveform representing a variation in differential value of the fuel pressure waveform; and
   a noise determiner that determines that noise overlaps with the fuel pressure waveform when the differential waveform has a value higher than a predetermined upper threshold or when the differential waveform has a value lower than a predetermined lower threshold.

2. The noise existence diagnosis device according to claim 1, wherein
   the fuel injection system is mounted on a multi-cylinder internal combustion engine,
   the fuel injection valve injects fuel into an injection cylinder and does not inject fuel into a non-injection cylinder when fuel is injected into the injection cylinder,
   the fuel pressure sensor has an injection-time sensor corresponding to the injection cylinder and a non-injection-time sensor corresponding to the non-injection cylinder,
   the waveform detector detects an injection-time fuel pressure waveform based on a detection value of the injection-time sensor and a non-injection-time fuel pressure waveform based on a detection value of the non-injection-time sensor at approximately the same timing, and
   the waveform detector corrects the fuel pressure waveform by subtracting the non-injection-time waveform from the injection-time waveform, and
   the differential calculator calculates the differential waveform with respect to the corrected fuel pressure waveform.

3. The noise existence diagnosis device according to claim 1, further comprising:
   an analyzer that analyzes an injection state based on the fuel pressure waveform detected by the waveform detector, wherein
   the fuel pressure waveform has
      a standard waveform corresponding to a period before the fuel pressure starts to decrease in accordance with a start of fuel injection,
      a decreasing waveform corresponding to a period while the fuel pressure decreases in accordance with an increase in injection rate, and
      an increasing waveform corresponding to a period while the fuel pressure increases in accordance with a decrease in the injection rate, and
   the differential calculator calculates the differential waveform with respect to each of the standard waveform, the decreasing waveform and the increasing waveform.

4. The noise existence diagnosis device according to claim 3, wherein
   the upper threshold or the lower threshold is set to correspond to each of the standard waveform, the decreasing waveform and the increasing waveform, and is set different among the standard waveform, the decreasing waveform and the increasing waveform.

5. The noise existence diagnosis device according to claim 3, wherein
   the upper threshold corresponding to the decreasing waveform has an absolute value that is set smaller than an absolute value of the lower threshold corresponding to the decreasing waveform.

6. The noise existence diagnosis device according to claim 3, wherein
   the lower threshold corresponding to the increasing waveform has an absolute value that is set smaller than an absolute value of the upper threshold corresponding to the increasing waveform.

* * * * *